US010122554B2

(12) United States Patent
Roux et al.

(10) Patent No.: US 10,122,554 B2
(45) Date of Patent: Nov. 6, 2018

(54) ELECTRONIC CIRCUIT CARD AND CORRESPONDING SIGNAL ACQUISITION AND GENERATION SYSTEM, INCLUDING ONE OR MORE PROGRAMMABLE DIGITAL MATRIX SWITCHES

(71) Applicant: Airbus Operations (SAS), Toulouse (FR)

(72) Inventors: Stephan Roux, Fontenilles (FR); Michel Pasquier, Leguevin (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 10 days.

(21) Appl. No.: 15/131,260

(22) Filed: Apr. 18, 2016

(65) Prior Publication Data
US 2016/0308699 A1   Oct. 20, 2016

(30) Foreign Application Priority Data
Apr. 16, 2015   (FR) ...................................... 15 53383

(51) Int. Cl.
*H04L 12/00* (2006.01)
*H04L 27/00* (2006.01)
(Continued)

(52) U.S. Cl.
CPC .... *H04L 27/0008* (2013.01); *H04L 12/40032* (2013.01); *H04L 67/12* (2013.01); *H04L 2012/4028* (2013.01)

(58) Field of Classification Search
CPC ................. H04L 27/0008; H04L 67/12; H04L 12/40032; G06F 13/385
See application file for complete search history.

(56) References Cited

U.S. PATENT DOCUMENTS 4,546,343 A * 10/1985 Higgins ............... H03G 1/0023
324/115
5,023,791 A * 6/1991 Herzberg ........... G05B 23/0256
324/73.1
(Continued)

FOREIGN PATENT DOCUMENTS

CN 101700810 B * 3/2013
EP 3032270 A1 * 6/2016 ......... G01R 31/3183

OTHER PUBLICATIONS

French Search Report, dated Feb. 3, 2016, priority document.

*Primary Examiner* — Berhanu Tadese
(74) *Attorney, Agent, or Firm* — Greer, Burns & Crain, Ltd.

(57) ABSTRACT

An electronic circuit card and a corresponding data acquisition and generation system, including a conditioning circuit for conditioning input signals of at least two types chosen from the following types: digital, discrete, analog. A binary modulator and resources for processing the different types of input signals are provided. A programmable digital matrix switch for input signals is used to route the input signals to the resources corresponding to the types of the signals. Alternatively, or additionally, the card includes an output signal modulator and an output signal programmable digital matrix switch used to route the modulated output signals to an amplifier as a function of their type. The programmable digital matrix switches make it possible to address constraints regarding the segregation of varying numbers of input/output signals of different types.

14 Claims, 5 Drawing Sheets

(51) Int. Cl.
*H04L 29/08* (2006.01)
*H04L 12/40* (2006.01)

(56) References Cited

U.S. PATENT DOCUMENTS

| | | | | |
|---|---|---|---|---|
| 5,077,671 | A * | 12/1991 | Leslie | G05B 23/0256 324/73.1 |
| 6,462,684 | B1 * | 10/2002 | Medelius | H03M 1/004 341/120 |
| 7,142,953 | B2 * | 11/2006 | Marshall | G06F 11/142 701/13 |
| 7,310,459 | B1 | 12/2007 | Rahman | |
| 8,069,293 | B1 * | 11/2011 | Rogan | G06F 13/385 370/248 |
| 8,620,638 | B1 * | 12/2013 | Chan | G06F 17/5022 703/13 |
| 8,879,410 | B1 * | 11/2014 | Kostrzewski | H04L 41/5019 340/2.2 |
| 2002/0150156 | A1 * | 10/2002 | Calvin | G01D 21/00 375/238 |
| 2004/0046570 | A1 * | 3/2004 | Teich | G01R 31/024 324/541 |
| 2005/0010958 | A1 | 1/2005 | Rakib et al. | |
| 2005/0033526 | A1 * | 2/2005 | Mcneilage | G01R 29/26 702/32 |
| 2005/0256662 | A1 * | 11/2005 | Alder | G01R 19/2516 702/119 |
| 2006/0057974 | A1 * | 3/2006 | Ziarno | H01Q 1/28 455/98 |
| 2006/0291589 | A1 * | 12/2006 | Eliezer | H03C 3/40 375/302 |
| 2008/0100136 | A1 * | 5/2008 | Langlois | H02J 1/10 307/9.1 |
| 2008/0258760 | A1 * | 10/2008 | Sullam | H03K 19/177 326/38 |
| 2009/0019311 | A1 * | 1/2009 | Cahon | G01R 31/008 714/27 |
| 2009/0265153 | A1 * | 10/2009 | Mazeau | G01D 21/00 703/13 |
| 2011/0238345 | A1 * | 9/2011 | Gauthier | G01R 31/002 702/64 |
| 2012/0034882 | A1 * | 2/2012 | Kauffman | H04B 1/3822 455/73 |
| 2012/0262009 | A1 * | 10/2012 | Becker | G01R 31/2844 307/113 |
| 2013/0234872 | A1 * | 9/2013 | Lugli | H03M 3/02 341/143 |
| 2013/0293325 | A1 * | 11/2013 | Becker | H01P 1/15 335/207 |
| 2014/0350780 | A1 * | 11/2014 | Chai | B64D 45/00 701/32.8 |
| 2015/0363981 | A1 * | 12/2015 | Ziarno | H04B 1/3822 701/101 |
| 2016/0103168 | A1 * | 4/2016 | Salvatge | H04B 10/2503 398/16 |
| 2016/0203659 | A1 * | 7/2016 | Chai | G05B 23/0256 701/32.8 |
| 2016/0308699 | A1 * | 10/2016 | Roux | H04L 27/0008 |

* cited by examiner

ELECTRONIC CIRCUIT CARD AND CORRESPONDING SIGNAL ACQUISITION AND GENERATION SYSTEM, INCLUDING ONE OR MORE PROGRAMMABLE DIGITAL MATRIX SWITCHES

CROSS-REFERENCES TO RELATED APPLICATIONS

This application claims the benefit of the French patent application No. 1553383 filed on Apr. 16, 2015, the entire disclosures of which are incorporated herein by way of reference.

BACKGROUND OF THE INVENTION

In a general way the present invention concerns electronic circuit cards and data acquisition and generation systems including such cards, in particular in the aeronautical field.

Aircraft are equipped with various electronic systems providing various functions enabling the aircraft to fulfil its role. In particular, these electronic systems include signal acquisition and generation systems in order to interface them to numerous sensors and actuators. These signals include signals of various types, notably discrete signal inputs DSI and discrete signal outputs DSO, analog signals, such as direct current analog input signals ANI-DC, alternating current analog input signals ANI-AC, analog output signals ANO, and digital input/output signals, such as ARINC429 signals. The ARINC 429 aeronautical standard covers the communication of digital data.

Known prior art signal acquisition and generation systems use dedicated electronic circuits for each type of input/output signal. The known systems therefore include as many electronic circuit cards as there are types of signals to be acquired or generated, which makes the system costly, bulky and complex. The maintenance of such a system is also time-consuming.

Moreover, these known prior art systems are dedicated to the aircraft equipped with them. If the technical environment of a computer, for example the number and/or type of inputs/outputs to be processed, changes, then new circuit cards must be designed. In a similar way, it is very complicated to reuse a data acquisition and generation system to equip an aircraft not having the same number and type of inputs/outputs to be processed.

Moreover, it is very often found that the circuit cards of a data acquisition and generation system of one aircraft cannot be reused to produce the system for another aircraft because the signal segregation constraints differ between the two aircraft. Compliance with the segregation constraints implies that the connection interfaces have no portions that could lead to faults in other portions.

SUMMARY OF THE INVENTION

An object of the present invention is to propose a new electronic circuit card and a corresponding new signal acquisition and generation system enabling a reliable response at lower cost to various types of input and/or output signal segregation constraints while making it possible to manage input and/or output signals the number and types of which may vary.

To this end the invention comprises an electronic circuit card for a system for acquiring and generating signals, characterized in that the card includes:

means for conditioning input signals of at least two types chosen from the following types: digital, discrete, analog, and means for binary modulation of the input signals;

members for processing the input signals, referred to as processing resources, including at least one resource for processing input signals of one of the two types and at least one resource for processing input signals of the other type;

a programmable digital matrix switch for input signals, placed between the binary modulation means and the processing resources, the programmable digital matrix switch being configured to route the modulated input signals to the processing resources as a function of their type;

and/or output signal binary modulation means for modulating signals of at least two types;

output signal amplification means; and a programmable digital matrix switch for output signals, placed between the output signal modulation means and the output signal amplification means, the output signal programmable digital matrix switch being configured to route the modulated output signals to the output signal amplification means as a function of their type.

Such an electronic circuit card design for a signal acquisition and generation system, which uses programmable digital matrix switches makes it possible to define input/output signal segregations of different types with great flexibility and great reliability. In actual fact, the input signal matrix switch and the output signal matrix switch form reconfigurable internal routing members that make it possible to reroute each signal as a function of its type and therefore to direct it to the appropriate processing system. The use of programmable digital matrix switches makes it easy to reconfigure the circuit card according to the number and type of signals.

In accordance with one particular aspect the system includes a programmable logic circuit, such as an FPGA, in which the matrix switch or switches is or are implemented.

In accordance with another particular feature, the input signal processing resources and/or the output signal binary modulation means are also implemented in the programmable logic circuit.

In accordance with one particular aspect, the output signal matrix switch and the output signal modulation means are also implemented in the programmable logic circuit.

In accordance with one particular embodiment, the input signal binary modulation means and/or the output signal binary modulation means include delta-sigma modulators.

In accordance with one particular aspect, the processing resources also include at least one output signal regulation resource configured to execute an output signal regulation loop, the card being configured to feed the output signal of the regulation resource back to a modulator forming part of the output signal binary modulation means, for example, the modulator being configured to modulate the difference between the regulated output signal and a reference value.

In accordance with another particular feature, the input signal conditioning means include differential amplifiers.

In accordance with one particular aspect, the output signal amplification means include class D amplifiers.

The invention also concerns a data acquisition and generation system characterized in that it includes a card as described above and means for matching input signals as a function of their type and/or means for matching modulated output signals as a function of their type.

In accordance with one particular aspect, the matching means are not on the electronic circuit card. Alternatively, the matching means could be on the circuit card.

In accordance with one particular aspect, the matching means are formed of passive components.

The invention also concerns an aircraft including a data acquisition and generation system, characterized in that the data acquisition and generation system is as described above.

BRIEF DESCRIPTION OF THE DRAWINGS

The invention will be clearly understood on reading the following description of exemplary embodiments with reference to the appended drawings in which.

DETAILED DESCRIPTION OF THE PREFERRED EMBODIMENTS

Figure 1:
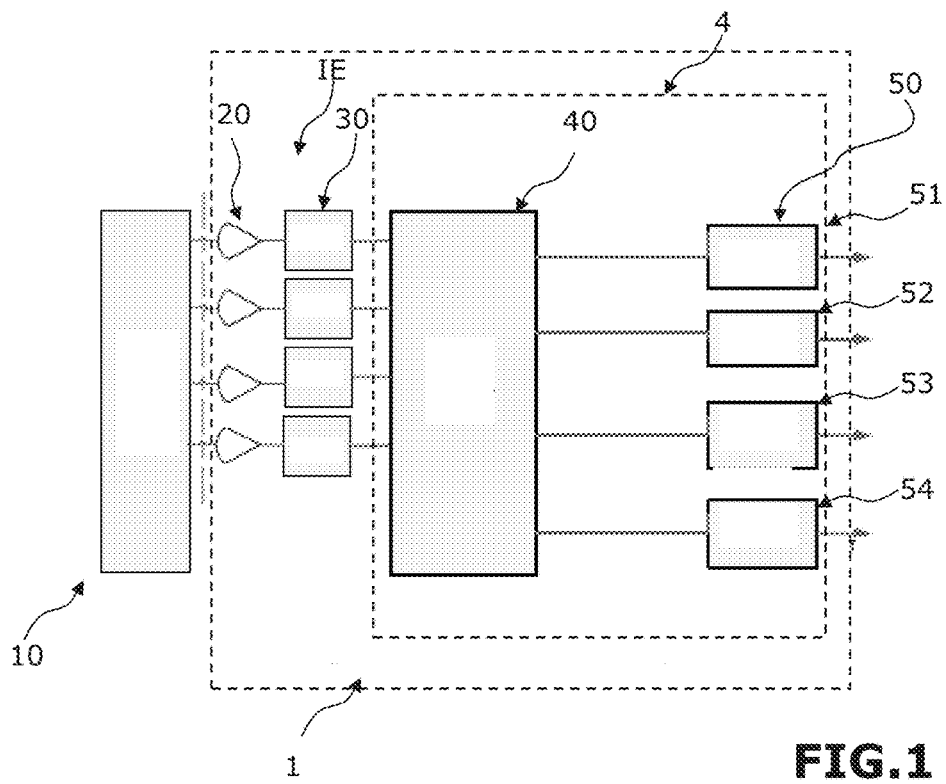
FIG. 1 is a theoretical diagram of a portion of the signal acquisition and generation system in accordance with one embodiment of the invention for processing input signals.
Figure 2:
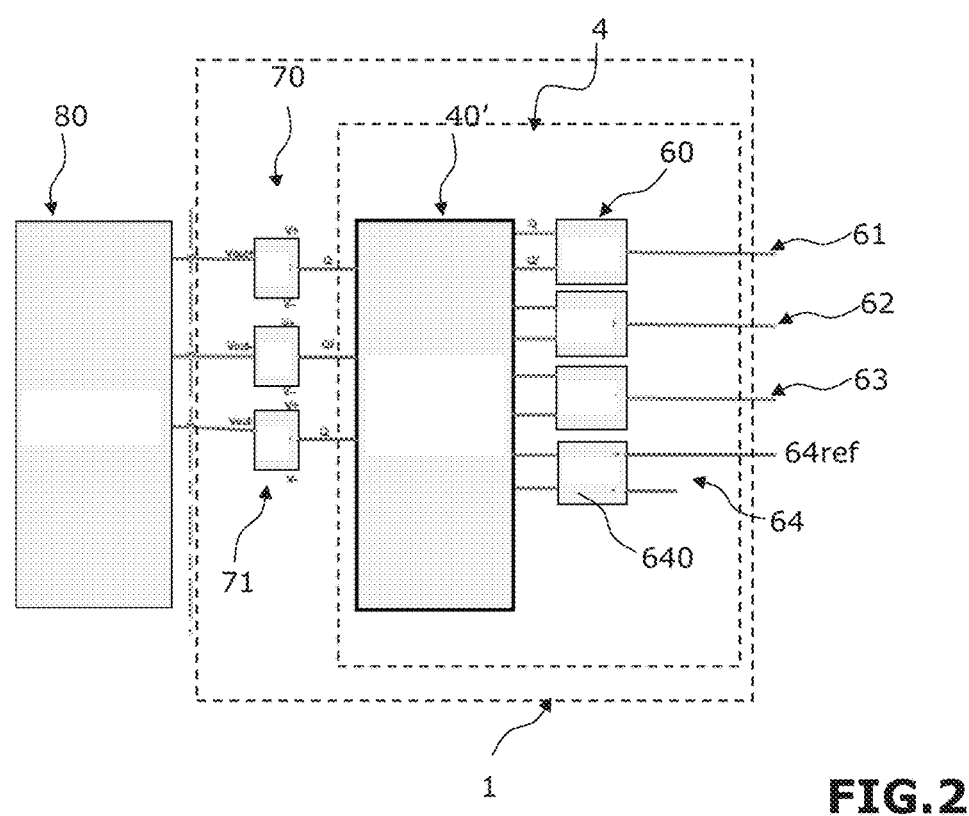
FIG. 2 is a theoretical diagram of a portion of the signal acquisition and generation system in accordance with one embodiment of the invention for processing output signals.

In FIG. 1 is shown part of a signal acquisition and generation system in accordance with one embodiment of the invention for processing input signals. Respectively, FIG. 2 shows another part of the signal acquisition and generation system for processing output signals. The data takes the form of input and output signals of different types. The system may be a data concentrator in which case it is necessary to acquire and to generate a large quantity of input/output signals in conjunction with other systems.

The data acquisition and generation system may advantageously equip an aircraft for acquisition and generation of signals of different types intended to be used in the environment of the aircraft, for example, to control certain members of the aircraft and/or to process signals from sensors onboard the aircraft.

For example, one input signal might be the signal emitted by a sensor connected to the system that processes the signal to transmit it to software controlling a member of the aircraft. Also by way of example, one output signal might be a signal generated by a software wave table and processed by the system to be transmitted to an audio output device, for example to sound an audible warning A wave table corresponds to a bank of signal samples.

The system includes input signal matching means 10 and an electronic circuit card 1. These matching means 10 are not on the electronic circuit card 1. Alternatively, the matching means 10 could be on the electronic circuit card 1.

The matching means 10 are formed of passive components used to produce various circuits according to the type of signal to be processed as shown in FIGS. 8 to 11.

Figure 8:
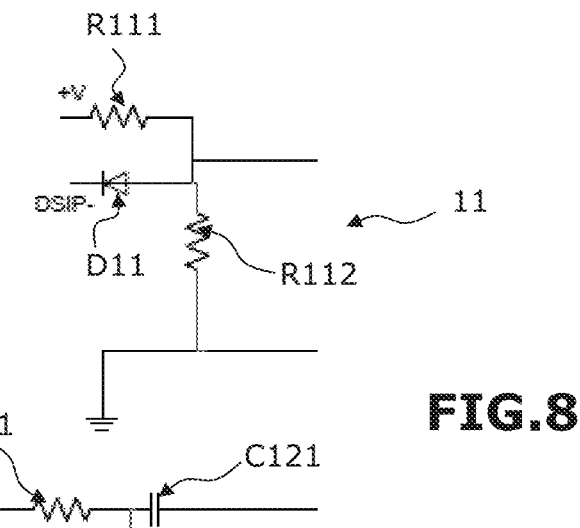
FIGS. 8 to 11 are theoretical diagrams of four input signal matching circuits of the system in accordance with one embodiment of the invention, said circuits enabling matching of different types of input signals.

The matching means 10 include a circuit 11 shown in FIG. 8 for matching low-level discrete signals DSI from a device such as a switch. The circuit 11 includes a circuit including a resistor R111 one terminal of which is connected to a potential V+ and a diode D11 the cathode of which (DSIP−) is connected to the low-level discrete signal device (not shown). The circuit also includes a resistor R112 one terminal of which is connected between the anode of the diode D11 and the terminal of the resistor R111 opposite that connected to the potential V+, the other terminal of the resistor R112 being connected to ground.

The output voltage, which is defined at the terminals of the resistor R112, corresponds to a low level (binary 0) when the device is in a closed state and to a high level (binary 1) when the device is in an open state.

Figure 9:
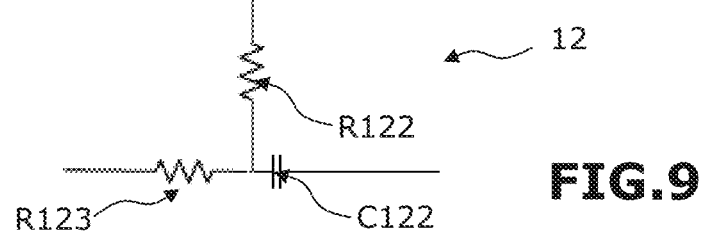

The matching means 10 also include a circuit 12 shown in FIG. 9 for matching digital input signals DGI. The signals DGI are for example signals from computers, for example in the form of 100 kbits frames for inter-computer communication. The circuit 12 includes at the input a differential circuit formed of three resistors R121, R122, R123 and at the output two coupling capacitors C121, C122. The output voltage is defined at the terminals of the capacitors opposite those connected to the resistor R122.

Figure 10:
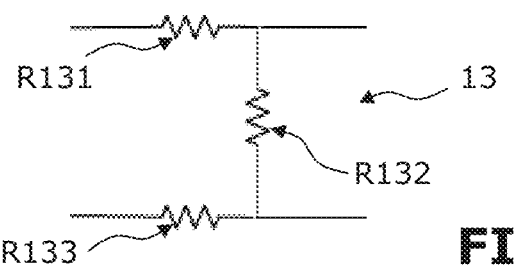

The matching means also include a circuit 13 shown in FIG. 10 for matching analog input signals ANI. The signals ANI are for example analog signals from DC or AC sensors. The circuit 13 includes a differential circuit formed of three resistors R131, R132, R133 and no coupling capacitors. The output voltage is defined at the terminals of the resistor R132.

Figure 11:
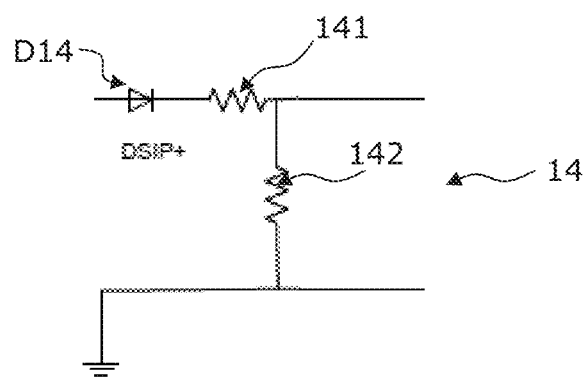

The matching means 10 also include a circuit 14 shown in FIG. 11 for matching discrete signals DSI from a high-level device such as a switch. The circuit includes a circuit including a resistor R141 in series with a diode D14 the anode of which (DSIP+) is connected to a low-level discrete signal device (not shown) connected to a positive voltage.

The circuit also includes a resistor R142 one terminal of which is connected to the other terminal of the resistor R141 and the other terminal of which is connected to ground. The output voltage is defined at the level of the resistor R142.

The output voltage defined at the terminals of the resistor R142 corresponds to a low level (binary 0) when the device is in the open state and to a high level (binary 1) when the device is in the closed state.

The electronic circuit card 1 includes input interfaces IE, for example 256 input interfaces, connected to the output of the matching means 10. Each input interface IE includes means 20 for conditioning the signals and means 30 for binary modulation of the signals.

Figure 3:
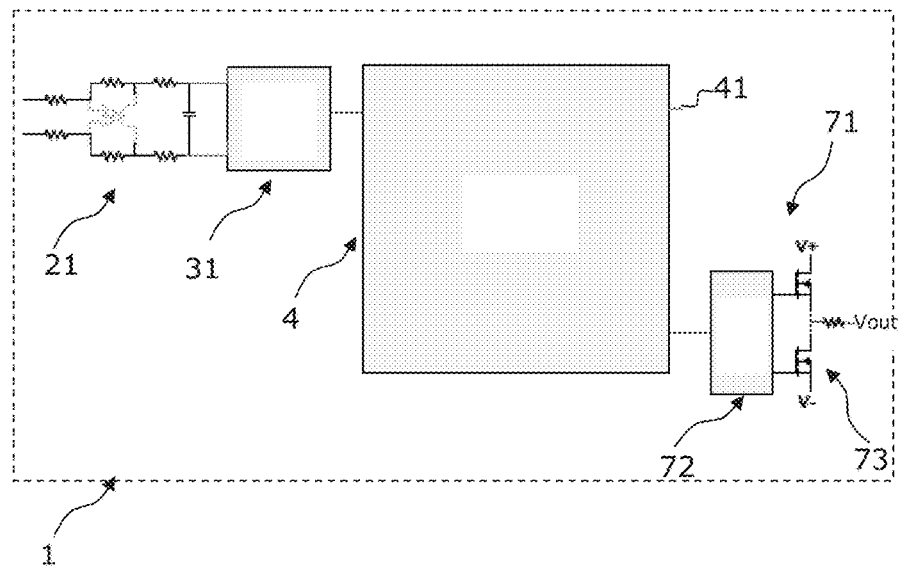
FIG. 3 is a simplified schematic of the signal acquisition and generation system in accordance with one embodiment of the invention for processing input signals and output signals.

As shown in FIG. 3, the conditioning means 20 for each input interface include a differential amplifier 21. Moreover, the signal binary modulation means 30 include a delta-sigma modulator 31.

The circuit card 1 includes a programmable matrix switch 40 between the binary modulation means 30 and the signal processing means 50, referred to as resources, described below.

The programmable matrix switch 40 enables switching one-bit serial input streams from the modulation means 30 to one-bit serial output streams distributed to the processing resources 50 appropriate to the type of the corresponding signals.

Figure 7:
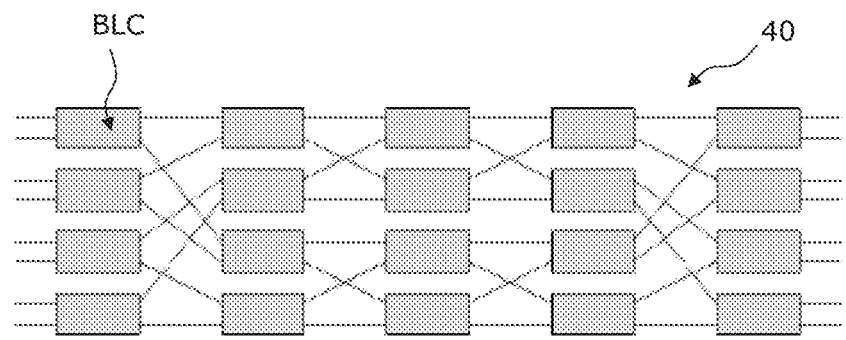
FIG. 7 is a simplified theoretical diagram of a matrix switch of the system in accordance with one embodiment of the invention.

In the simplified example with eight inputs shown in FIG. 7, the digital matrix switch 40 includes four rows each with five logic blocks BLC. Each logic block has two inputs and two outputs connected to two inputs of other blocks and a function for cross-connecting the inputs to direct them to the opposite outputs or to direct the inputs to the corresponding outputs without crossing over. The interconnections between the blocks form routes that can be reconfigured by software.

The signal processing resources 50 are implemented digitally, for example in an FPGA-type digital component as indicated below. The resources include at least one resource 51 for processing discrete input signals DSI and at least one resource 52 for processing analog input signals ANI. In accordance with another embodiment, the resources 50 further include at least one resource 53 for processing digital input signals DGI.

Figure 4:
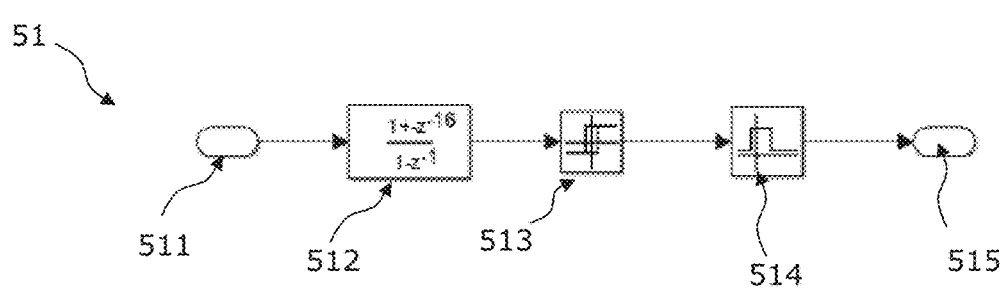
FIGS. 4 to 6 are theoretical diagrams of three processing resources of the system in accordance with one embodiment of the invention, the resources enabling processing of different types of input signals.

FIG. 4 shows one embodiment of a resource 51 for processing modulated discrete input signals DSI 511. The resource 51 includes a cascaded integrator-comb (CIC) filter 512, a programmable hysteresis comparator 513 and a programmable anti-bounce filter 514. At the output 515 of this resource 51 the thus-processed signal DSI is transmitted to software that can use the processed signal DSI for a particular application. In accordance with one embodiment, the software is located on another circuit card. This resource 51 makes it possible to process both low-level discrete input signals (DSIP−) and high-level discrete input signals (DSIP+).

Figure 5:
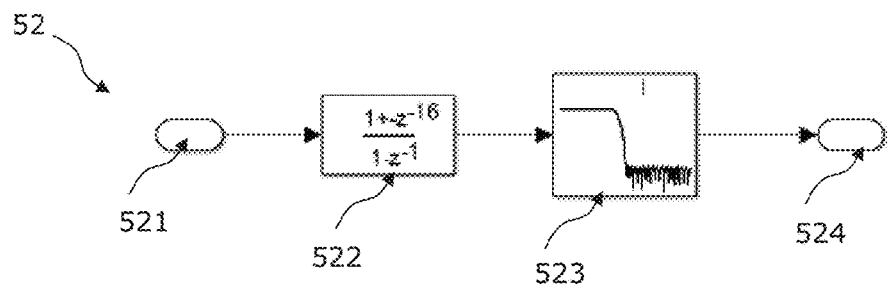

FIG. 5 shows one embodiment of a resource 52 for processing modulated analog input signals ANI 521. The resource 52 includes a CIC filter 522 and a programmable low-pass decimation filter 523. At the output 524 of this resource 52 the thus-processed signal ANI is transmitted to software that can use it for a particular application. In accordance with one embodiment, the software is located on another circuit card.

Figure 6:
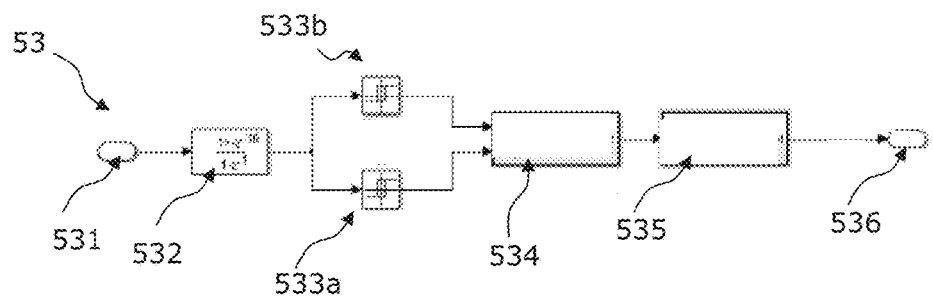

FIG. 6 shows one embodiment of a resource 53 for processing modulated digital input signals DGI 531. The resource 53 includes a CIC filter 532. On the downstream side of this CIC filter 532, the resource 53 includes, for differential signals, a low-level detection hysteresis comparator 533a and a high-level detection hysteresis comparator 533b connected in parallel with each other. These comparators are programmable to enable adjustment of the interference filter. The comparators enable generation of a return-to-zero (RZ) coded frame made up of a series of binary 1 and a return-to-zero (RZ) coded frame made up of a series of binary 0. The resource 53 includes on the downstream side of these hysteresis comparators verification means 534 for verifying characteristics of the frames of bits, such as their frequency and their duration, and parity check and deserialization means 535. At the output 536 of this resource the signal DGI processed in this way is transmitted to software that can use the processed signal DGI for a particular application. In accordance with one embodiment the software is located on another circuit card.

Alternatively, for a non-return-to-zero (NRZ) coded simple (non-differential) input signal the two hysteresis comparators could be replaced by a single hysteresis comparator.

Each CIC filter serves as a demodulator. Moreover, the triggering level of each hysteresis comparator (also known as a Schmidt trigger) is adjustable by software, which makes it possible to adjust the thresholds according to the required signal processing as a function of the imposed constraints. In the example shown in the figures, each CIC filter has in the z plane a transfer function H(z) of the following type:

$$H(z) = \frac{1 + -z^{-16}}{1 - z^{-1}}$$

Output signals can be generated from wave table data and/or constant values and/or output signals regulated and processed by the system.

The electronic circuit card 1 of the system, or an electronic circuit card separate from the circuit card that manages the input signals, includes output signal binary digital modulation means 60 adapted to perform one-bit modulation of the output signals. The output signals 61, 62, 63, 64 may be of digital type DGO and/or alternating current type ACS and/or audio type and/or regulated output signals. In the remainder of the description, the various output signal management means are described as being located on the circuit card 1 but the description also applies if a circuit card separate from the circuit card 1 is used.

The output signal modulation means 60 include delta-sigma modulators. In accordance with one embodiment, the delta-sigma modulators are of the second order.

The electronic circuit card 1 includes output signal amplification means 70 for each output of the matrix switch 40' described below. The output signal amplification means 70 include class D amplifiers 71. As shown in FIG. 1, the class D amplifiers each include two transistors 73 respectively connected to a V+ supply and a V− supply controlled by a gate controller 72.

To amplify a simple (non-differential) output signal, the system is configured to route the modulated output signal of polarity Q to one of the class D amplifiers 71 via the output signal matrix switch 40'. The amplifier receives the modulated output signal of polarity Q and generates an output voltage Vout.

To amplify a differential output signal, the system uses two of the class D amplifiers 71, one receiving the portion of polarity Q of the differential signal and the other receiving the portion of the opposite polarity, denoted Q/, of the signal to generate a differential output voltage Vout+; Vout−.

A programmable digital matrix switch 40' for output signals is placed between the output signal binary digital modulation means 60 and the output signal amplification means 70. The matrix switch 40', which is similar to the matrix switch 40, is configured to route the 1-bit modulated output signals to the output signal amplification means 70 according to whether the signal is simple (non-differential) or differential and as a function of the signal type.

The system also includes means 80 for matching the output signals from the amplification means 70. The output signal matching means 80 are not on the electronic circuit card 1. Alternatively, the output signal matching means 80 could be on the electronic circuit card.

The output signal matching means 80 are formed of passive components used to produce a number of circuits corresponding to different types of output signals to be matched.

Figure 12:
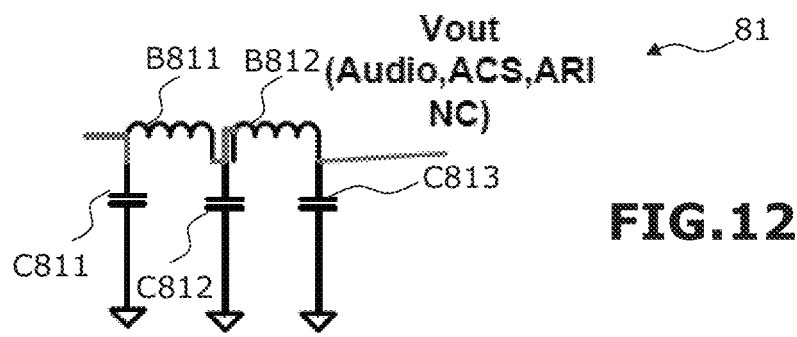
FIGS. 12 to 14 are theoretical diagrams of three output signal matching circuits of the system in accordance with one embodiment of the invention, said circuits enabling matching of different types of output signals.

The matching means 80 include a circuit 81 shown in FIG. 12 for matching output digital signals, such as audio, ACS and ARINC signals. This circuit 81 takes the form of an LC type passive filter including two windings B811 and B812 connected to each other by one of their terminals and three capacitors C811, C812, C813. One terminal of the capacitor C812 is connected to the mid-point at which the windings B811 and B812 are connected. One terminal of the capacitor C811, respectively C813, is connected to the terminal of the winding B811, respectively B812, opposite that connected to the mid-point. The other terminal of each capacitor is connected to ground. The output voltage Vout of this circuit is defined at the terminals of the capacitor C813.

Figure 13:
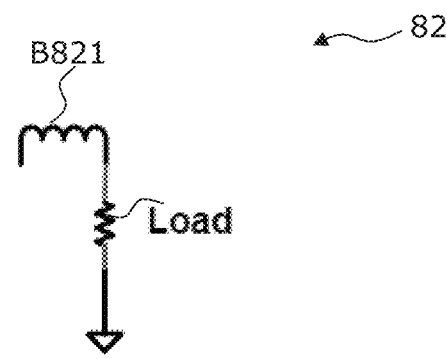

The matching means 80 include a circuit 82 shown in FIG. 13 for matching analog output signals (ANO). The circuit 82 includes a winding B821 one terminal of which is connected to a load (Load in FIG. 13). The load may be a device supplied with power by the circuit 82. The opposite terminal of the load is connected to ground. The output voltage Vout of this circuit is defined at the terminals of the load.

Figure 14:
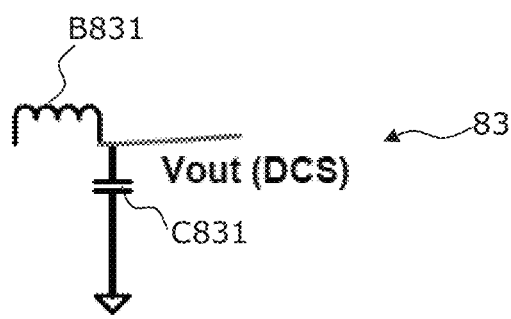

The matching means 80 include a circuit 83 shown in FIG. 14 for matching direct current power supply output signals (DCS). The circuit 83 includes an LC type filter formed by a winding B831 one terminal of which is connected to a capacitor C831. The opposite terminal of the capacitor C831 is connected to ground.

The output signals matched in this way can be used for a given application in the environment of the aircraft.

The processing resources 50 also include at least one output signal regulation resource 54. The resource is configured to execute an output signal regulation loop for an output signal from a device connected to the input signal matching means 10 of the system. In particular, the output signal to be regulated is treated as an input signal and matched, conditioned and modulated to be routed by the matrix switch to the regulation resource. The system is configured to feed the output of the regulation resource 54 back to a modulator 640 of the modulation means 60 for output signals that modulates the difference between the regulated output signal 64 and a reference value 64ref.

As shown in FIGS. 1-2, the system includes a programmable logic circuit 4 in which the input signal digital matrix switch 40, the processing resources 50, the output signal digital matrix switch 40' and the output signal binary digital modulation means 60 are implemented. The programmable logic circuit includes a communication bus 41. This bus provides software access to the programmable logic circuit for reconfiguring the routes of each matrix switch. The bus also enables communication of data such as the processed input signals between the circuit card of the system and software located on another circuit card. In accordance with one embodiment the programmable logic circuit is an FPGA (field-programmable gate array). Alternatively, the FPGA may be replaced by an ASIC (application-specific integrated circuit) component.

The operation of the system to process input signals is described below.

The input signals are matched by the matching means 10 to protect them from physical interference such as lightning and to convert them to voltage levels appropriate to the components of the circuit card. This matching is effected using passive components and off the circuit card, which makes the processing of the signals more reliable and simplifies the maintenance of the system. As mentioned above, the input signal matching means include matching circuits for different types of input signals and in the form shown of digital DGI, discrete DSI and analog ANI type.

The matched input signals are sent to the input interfaces IE of the circuit card 1 where they are conditioned by the differential amplifiers 21 of the conditioning means 20 and then one-bit modulated by delta-sigma modulators 31.

Each of the modulated input signals is routed by the digital matrix switch 40 to one of the processing resources 50 appropriate to the signal type. The routing that the digital matrix switch makes possible makes it possible to provide a reliable and flexible response to constraints in respect of segregating signals of different types.

The use of the matrix switch 40 makes it possible to define the routes between the inputs and the outputs of the switch and thus to define signal segregations independently of the processing resources. In actual fact, the matrix switch 40 forms a reconfigurable internal routing member that enables rerouting of each signal to the desired processing resource. In other words, the switch enables assignment of the modulated input signals to the resources as a function of the types of the signals.

The operation of the system for processing output signals is described below.

Wave table data and/or constant values and/or output signals forming output signals 61, 62, 63, 64 are one-bit modulated by the output signal binary digital modulation means 60.

The modulated output signals are routed by the matrix switch 40' to the output signal amplification means 70. A simple (non-differential) signal is routed to the input of one of the amplifiers 71 whereas, for a differential signal, the portion of polarity Q of the signal is routed to one of the amplifiers 71 and the portion of the signal with the opposite polarity Q/ is routed to another simple or differential amplifier 71. The signals from the amplification means 70 are then matched off the circuit card by the matching means 80 of the system and as a function of their type.

Compared to conventional data acquisition and generation systems, the circuit card and the corresponding data acquisition and generation system in accordance with the invention make it possible to achieve a significant integration improvement and a reduction of design and maintenance costs.

In accordance with one embodiment of the invention, the number of input interfaces of the circuit card for input signals is 256 per circuit card and the number of output interfaces of the circuit card for output signals is 32. It is therefore possible to integrate 1024 inputs and 128 outputs with only four circuit cards at the same time as conforming to the signal segregation constraints with limited energy consumption and the possibility of customizing the acquisition and generation system to each aircraft type at lower cost.

The use of matrix switches implemented within a programmable digital component, such as an FPGA, makes it possible to address the signal segregation constraints reliably at lower cost at the same time as enabling management of input/output signals varying in terms of number and type.

Moreover, the implementation of the system in the form of an electronic circuit card and signal matching means off the electronic circuit card makes it possible to isolate the matching means from the circuit card and therefore easy to replace them or select them to customize the system as a function of the type of aircraft to be equipped while preserving a common base in the form of the electronic circuit card.

The present invention is in no way limited to the embodiments described and shown; conversely, a person skilled in the art will know how to arrive at any variant thereof conforming to the spirit of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electronic circuit card for a system for acquiring and generating signals, comprising:
   (1) means for conditioning input signals of at least two types chosen from the following types: digital, discrete, and analog;
   means for binary modulation of said input signals;
   processing resources for processing the input signals, including at least one resource for processing input signals of one of the two types and at least one other resource for processing input signals of the other type;
   a programmable digital matrix switch for input signals, placed between the binary modulation means and the processing resources, said programmable digital matrix switch being configured to route the modulated input signals to the processing resources as a function of their type; and
   (2) output signal binary modulation means for modulating signals of at least two types;
   output signal amplification means; and
   a programmable digital matrix switch for output signals, placed between said output signal modulation means and the output signal amplification means, said output signal programmable digital matrix switch being configured to route the modulated output signals to the output signal amplification means as a function of their type;
   wherein each of said means for conditioning, said means for binary modulation, said processing resources, said programmable digital matrix switch for input signals, said output signal binary modulation means, said output signal amplification means, and said programmable digital matrix switch for output signals are on the same electronic circuit card; and
   wherein the card further comprises a field-programmable gate array (FPGA) or an application-specific integrated circuit (ASIC), wherein both the programmable digital matrix switch for input signals and the programmable digital matrix switch for output signals are implemented in said FPGA or in said ASIC.

2. The electronic circuit card according to claim 1, wherein the electronic circuit card includes a programmable logic circuit in which at least one of the programmable digital matrix switch for input signals or the programmable digital matrix switch for output signals is implemented.

3. The electronic circuit card according to claim 2, wherein at least one of the input signal processing resources or the output signal binary modulation means is also implemented in said programmable logic circuit.

4. The card according to claim 2, wherein both the programmable digital matrix switch for input signals and the programmable digital matrix switch are implemented in the programmable logic circuit.

5. The electronic circuit card according to claim 1, wherein the input signal binary modulation means and the output signal binary modulation means include delta-sigma modulators.

6. The electronic circuit card according to claim 1, wherein said processing resources also include at least one output signal regulation resource configured to execute an output signal regulation loop, the card being configured to feed the output signal of the regulation resource back to a modulator forming part of said output signal binary modulation means.

7. The electronic circuit card according to claim 6, wherein said modulator is configured to modulate the difference between said regulated output signal and a reference value.

8. The electronic circuit card according to claim 1, wherein said input signal conditioning means include differential amplifiers.

9. The electronic circuit card according to claim 1, wherein said output signal amplification means include class D amplifiers.

10. A data acquisition and generation system, comprising:
   an electronic circuit card for a system for acquiring and generating signals, comprising:
   (1) means for conditioning input signals of at least two types chosen from the following types: digital, discrete, and analog;
   means for binary modulation of said input signals;
   processing resources for processing the input signals, including at least one resource for processing input signals of one of the two types and at least one other resource for processing input signals of the other type;
   a programmable digital matrix switch for input signals, placed between the binary modulation means and the processing resources, said programmable digital matrix switch being configured to route the modulated input signals to the processing resources as a function of their type; and
   (2) output signal binary modulation means for modulating signals of at least two types;
   output signal amplification means; and
   a programmable digital matrix switch for output signals, placed between said output signal modulation means and the output signal amplification means, said output signal programmable digital matrix switch being configured to route the modulated output signals to the output signal amplification means as a function of their type;
   and at least one of
      means for matching input signals as a function of their type, and
      means for matching modulated output signals as a function of their type;
   wherein each of said means for conditioning, said means for binary modulation, said processing resources, said programmable digital matrix switch for input signals, said output signal binary modulation means, said output signal amplification means, and said programmable digital matrix switch for output signals are on the same electronic circuit card;
   wherein the card further comprises a field-programmable gate array (FPGA) or an application-specific integrated circuit (ASIC), wherein both the programmable digital matrix switch for input signals and the programmable digital matrix switch for output signals are implemented in said FPGA or in said ASIC.

11. The system according to claim 10, wherein said means for matching input signals and said means for matching modulated output signals are not on the electronic circuit card.

12. The system according to claim 11, wherein said means for matching input signals and said means for matching modulated output signals are formed of passive components.

13. The system according to claim 11, wherein the signal acquisition and generation system is for use in an aircraft.

14. The system according to claim 10, wherein the card includes a programmable logic circuit in which both the programmable digital matrix switch for input signals and the programmable digital matrix switch for output signals are implemented.

\* \* \* \* \*